US006446931B1

(12) United States Patent
Hayashi

(10) Patent No.: US 6,446,931 B1
(45) Date of Patent: *Sep. 10, 2002

(54) STRUT MOUNT

(75) Inventor: Kazuhiko Hayashi, Kanagawa-ken (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 532 days.

(21) Appl. No.: 08/835,460

(22) Filed: Apr. 8, 1997

(51) Int. Cl.$^7$ .............................................. F16M 13/00
(52) U.S. Cl. ....................................................... 248/635
(58) Field of Search ............................... 248/635, 636, 248/638, 562, 548

(56) References Cited

U.S. PATENT DOCUMENTS

| | | | | |
|---|---|---|---|---|
| 4,706,947 A | * | 11/1987 | Makibayashi et al. ...... | 248/562 |
| 5,571,263 A | * | 11/1996 | Koester et al. ......... | 248/636 X |
| 5,580,028 A | * | 12/1996 | Tomczak et al. ............ | 248/635 |
| 5,722,631 A | * | 3/1998 | Dorton ........................ | 248/635 |
| 5,743,509 A | * | 4/1998 | Kanda et al. ................ | 248/635 |
| 5,762,313 A | * | 6/1998 | Siemer ........................ | 248/635 |
| 5,855,364 A | * | 1/1999 | Reh et al. ............... | 248/562 X |

FOREIGN PATENT DOCUMENTS

| JP | 6-221360 | 8/1994 |
|---|---|---|

* cited by examiner

Primary Examiner—Ramon O. Ramirez
(74) Attorney, Agent, or Firm—Jordan and Hamburg LLP

(57) ABSTRACT

A strut mount in a vehicular suspension system which receives a load from a shock absorber includes a washer and an upper sheet fixable at spaced apart locations on a piston rod of the shock absorber. An upper ring portion and a lower ring portion are disposed between the washer and the upper sheet. A plate disposed between the upper and lower rubber ring portions extends outwardly in the radial direction. The strut mount further includes a coil spring receiving rubber ring portion provided on a lower side of the plate for receiving a coil spring disposed about the shock absorber. At least both the lower rubber ring portion and the coil spring receiving rubber ring portion are formed as an integral structure on the plate.

6 Claims, 3 Drawing Sheets

STRUT MOUNT

BACKGROUND OF THE INVENTION

The present invention relates to a strut mount of a so-called "separate loading" type which receives a load from a shock absorber used in a vehicular suspension system and the one from a coil spring disposed about the shock absorber.

A typical prior-art strut mount of such a separate loading type is shown in FIG. 1. As seen, the shock absorber has a piston rod 1. There is provided a washer 2 fixed to the top end of the piston rod 1 with a nut 3. There is also an upper flasher 4 fixed to the piston rod 1 at a predetermined distance from the washer 2. Further, a rubber bellows (not shown) covering the shock absorber is fixed at the end thereof to the upper sheet 4. An upper rubber ring 100 and lower rubber ring 101 are provided between the washer 2 and upper sheet 4. A plate 5 is provided between the rubber rings 100 and 101. It extends outwardly in the radial direction. Another rubber ring 102 is provided on the lower side, near the outer circumference, of the plate 5 to receive a coil spring 6 disposed about the shock absorber. The plate 5 has radial-movement suppressing rings 5A fixed the upper and lower sides, respectively, thereof.

In this prior-art strut mount, the upper rubber ring 100, lower rubber ring 101 and coil spring receiving rubber ring 102 are formed separately by vulcanization-molding. The rubber rings 100 to 102 thus formed are set separately in place.

More specifically, the upper sheet 4 is fixed to the piston rod 1, the lower rubber ring 101 is set on the upper sheet 4, and then the coil spring 6 is disposed about the shock absorber. The rubber ring 102 is set on the top end of the coil spring 6. After that, the plate 5 is fitted to the assembly thus formed. Thereafter, the upper ring 100 and washer 2 are set in place and then the nut 3 is tightened. Thus, the prior-art strut mount is assembled through many steps. Three types of molds are required for vulcanization-molding the rubber rings. Therefore, manufacturing and assembling costs are high for the prior-art strut mounts.

SUMMARY OF THE INVENTION

Accordingly, it is an object of the invention to overcome the above-mentioned drawbacks by providing a strut mount easy to manufacture and assemble and thus low in manufacturing costs.

The above object can be accomplished by providing a strut mount comprised of a plate, and upper and lower rubber ring portions and a coil spring receiving rubber ring portion, of which at least two are formed integrally by vulcanization-molding.

According to the present invention, the numbers of parts and manufacturing steps for a strut mount can be reduced and thus the strut mount can be manufactured with extremely reduced costs, owing to the integral formation of at least two of the rubber ring portions on the plate by vulcanization-molding.

These objects and other objects, features, aspects and advantages of the present invention will become more apparent from the following detailed description of the present invention when taken in conjunction with the accompanying drawings.

DETAILED DESCRIPTION OF THE INVENTION

Figure 1:
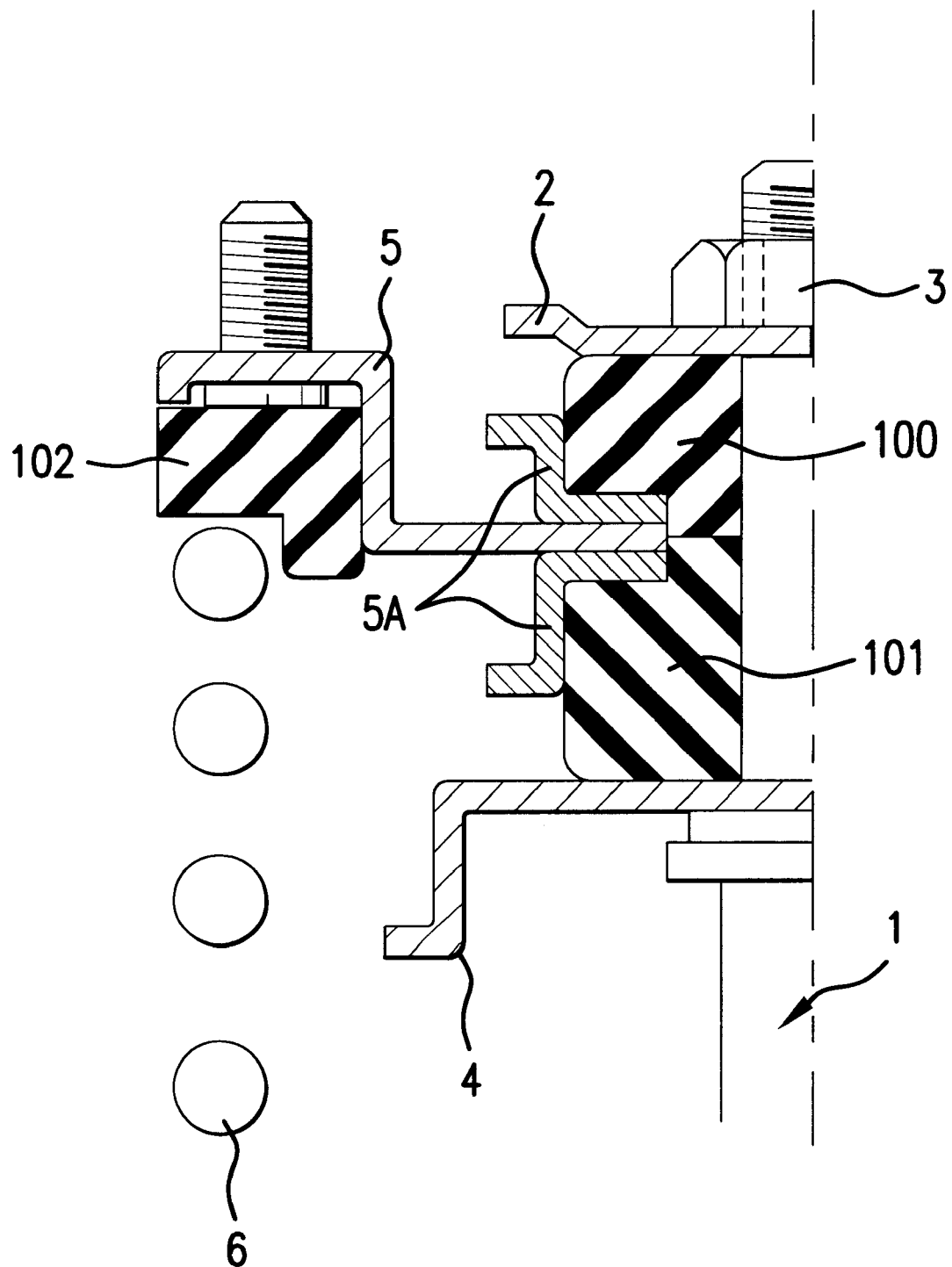
FIG. 1 is a sectional view of a prior-art strut mount.
Figure 2:
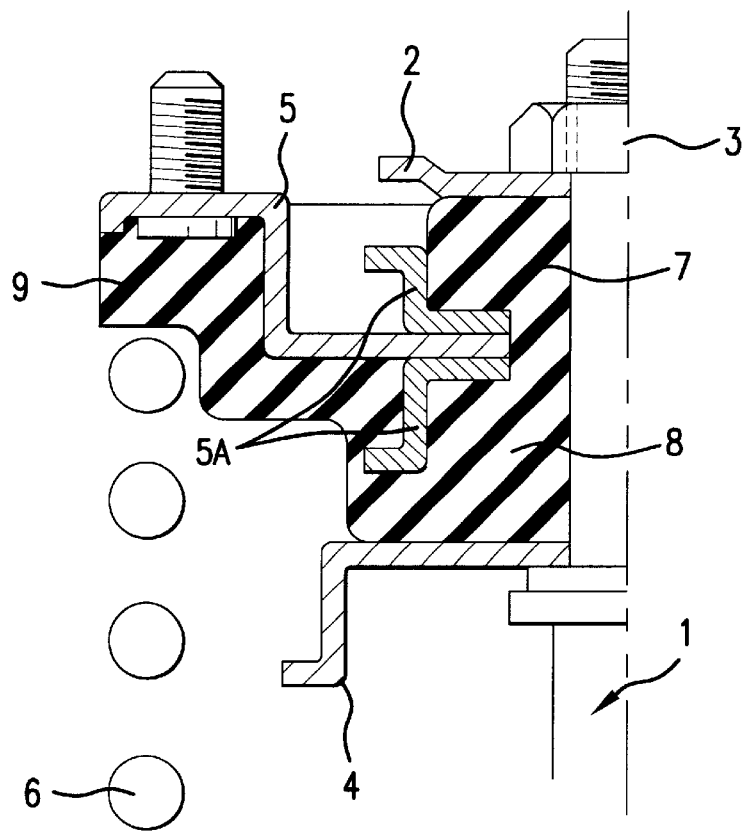
FIG. 2 is a sectional view of a first embodiment of strut mount according to the present invention.

FIG. 2 illustrates a first embodiment of a strut mount according to the present invention. As seen, the shock absorber of a vehicular-suspension system includes piston rod 1. The strut mount has a washer 2 fixed to the top end of the piston rod 1, and an upper sheet 4 fixed to the piston rod 1 at a predetermined distance from the washer 2. An upper rubber ring portion 7 and lower rubber ring portion 8 are provided between the washer 2 and upper sheet 4. A plate 5 is provided between the upper and lower rubber ring portions 7 and 8. It extends outwardly in the radial direction. Also a pair of upper and lower radial-movement suppressing rings 5A is provided on the plate 5 and between the upper and lower rubber ring portions 7 and 8. The radial-movement suppressing rings 5A are fixed, by welding or any other similar means, to the upper and lower sides, respectively, of the inner circumferential portion of the plate 5. Also, a rubber ring portion 9 is disposed on the lower side of the outer circumferential portion of the plate 5 to receive a coil spring disposed about the shock absorber.

The plate 5 is extended outwardly in the radial direction, bent upwardly at an intermediate point of the extension to predetermined height, then extended horizontally and outwardly in the radial direction from that height, and further bent downwardly at a position near the end thereof. The coil spring receiving rubber ring portion 9 is provided under the plate 5 thus shaped so as to be flush at the outer end face thereof with the outer end of the rubber ring portion 9 as shown. The upper one of the radial-movement suppressing rings 5A has a generally crank-like section. Its crank-like section is shaped such that its base portion to be fixed to the inner circumferential portion of the plate 5 extends horizontally, it is followed by a portion rising generally vertically to a height and the rising portion is bent horizontally and outwardly in the radial direction from that height. The lower one of the radial-movement suppressing rings 5A is configured the same as the upper one, namely, a mirror-image structure of the upper one. According to this embodiment, the upper and lower rubber ring portions 7 and 8 and the coil spring receiving rubber ring portion 9 are formed integrally oil the plate 5 and radial-movement suppressing rings 5A by vulcanization-molding.

For assembling the strut mount thus formed to the piston rod 1, the upper sheet 4 is fixed to the piston rod 1, the integrally formed assembly of the plate 5, radial-movement suppressing rings 5A and three rubber ring portions 7 to 9 is set onto the piston rod 1, and the washer 2 is fitted onto the top end of the piston rod 1. Thereafter, the nut 3 is tightened.

Further, in accordance with a variant of this embodiment, any other combination of at least two of the rubber ring portions 7 to 9 may be formed integrally on the plate 5.

Figure 3:
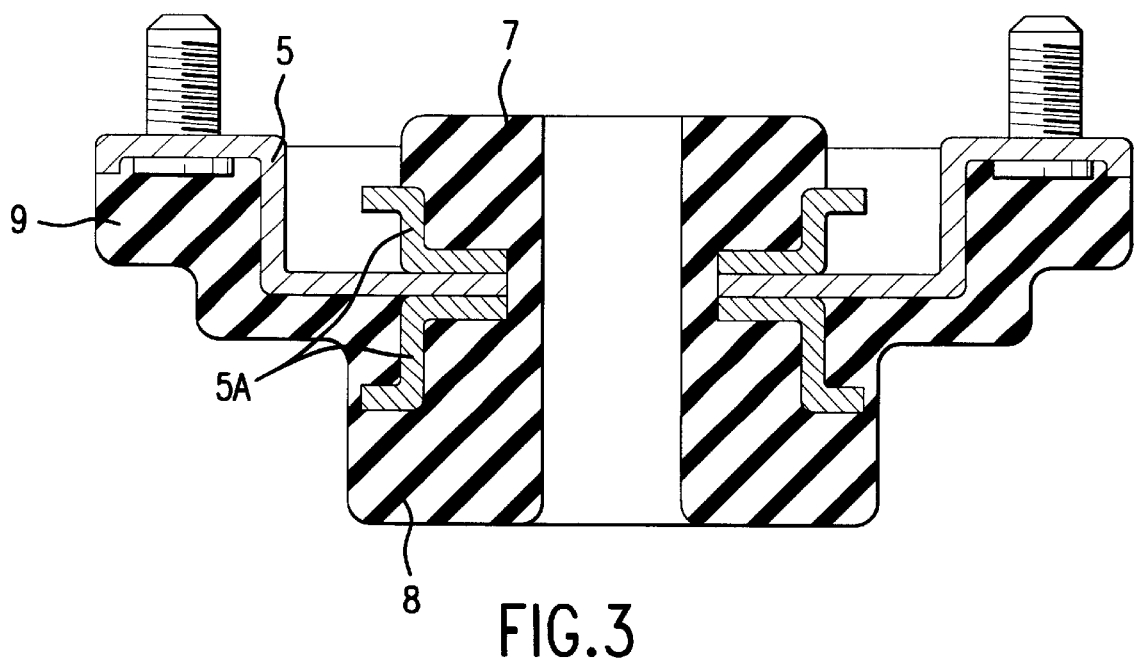
FIG. 3 is a sectional view of an integral formation, in one piece, of a plate, radial-movement suppressing rings and three rubber ring portions in the first embodiment in FIG. 2.

As seen from FIG. 3, the three rubber ring portions 7 to 9 are formed integrally on the plate 5 in one piece. FIG. 3 is a sectional view of this integrally formed piece before being assembled to the piston rod 1. This piece can be handled as a single part.

Figure 4:
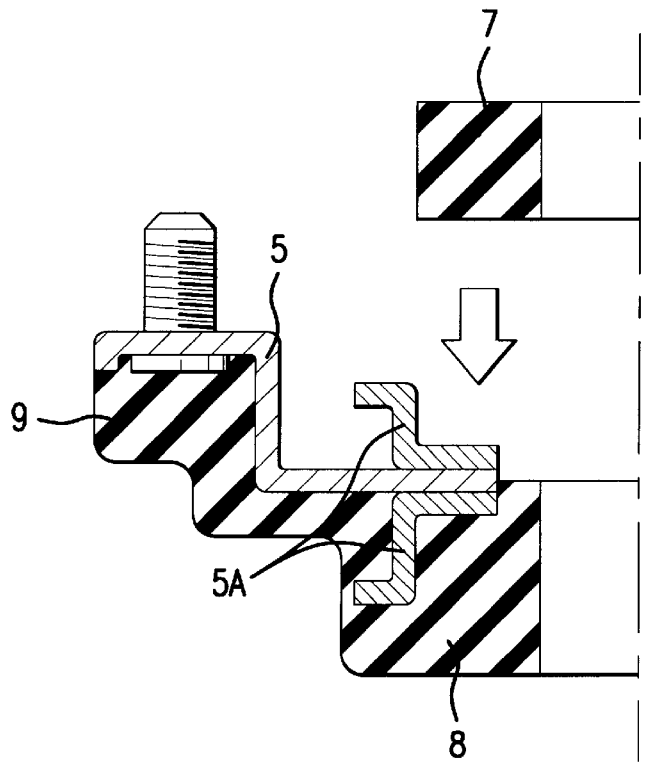
FIG. 4 is a sectional view of a second embodiment of the present invention.

FIG. 4 shows the second embodiment of the present invention, in which the lower rubber ring portion 8 and coil spring receiving rubber ring portion 9 are integrally formed on the plate 5 into a one-piece structure by vulcanization-molding and the upper rubber ring portion 7 is formed separately from the integrally formed one-piece structure so as to be assembled to the piston rod 1 later during assembling of the strut mount to the piston rod.

Figure 5:
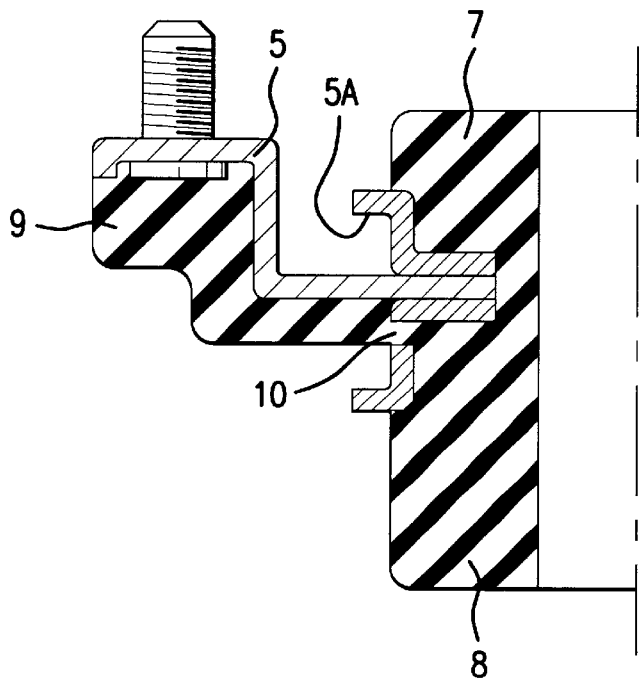
FIG. 5 is a sectional view of a third embodiment of the present invention.

FIG. 5 shows the third embodiment of the present invention. In this embodiment, the falling portion of the lower radial-movement suppressing ring 5A that is not fixed to the plate 5 is exposed, and not embedded in the rubber. Further, the loser radial-movement suppressing ring 5A has formed in the falling portion thereof holes 10 through which the lower rubber ring portion 8 joins the coil spring receiving rubber ring portion 9.

Also according to this embodiment, the three rubber ring portions 7 to 9 are formed integrally with the plate 5 by vulcanization-molding. Since the radial-movement suppressing rings have the outer ends thereof not embedded in the rubber, the rubber itself can maintain its durability for a longer time.

As having been described in the foregoing, at least two of the upper and lower rubber ring portions and coil spring receiving rubber ring portion which would otherwise be separate from one another in the prior-art strut mount, are formed integrally on the plate to result in a one-piece structure. Thus, the necessary number of the vulcanization forming molds is reduced and also the number of manufacturing steps is reduced. The strut mounts according to the present invention are easy to manufacture and assemble, and therefore can be produced with extremely reduced costs.

What is claimed is:

1. A strut mount in a vehicular suspension system which receives a load from a shock absorber having a piston rod, the strut mount comprising:

a washer fixable to a top end of the piston rod;

an upper sheet fixable to the piston rod at a predetermined distance from the washer;

an upper rubber ring portion and a lower rubber ring portion disposed between said washer and said upper sheet;

a plate disposed between said upper rubber ring portion and said lower rubber ring portion and extending outwardly in the radial direction; and a coil spring receiving rubber ring portion provided on a lower side of said plate for receiving a coil spring disposed about the shock absorber, said lower rubber ring and said coil spring receiving rubber ring portion each serving as impact absorbing bodies, at least said lower rubber ring portion and said coil spring receiving rubber ring portion being formed as an integral structure molded to said plate by vulcanization molding thereby defining a joining portion interconnecting said lower rubber ring portion and said coil spring receiving rubber ring promotion, said joining portion overlying at least an area portion of said lower side of said plate.

2. A strut mount according to claim 1, further comprising;

an upper radial-movement suppressing ring and a lower radial-movement suppressing ring fixed respectively to an upper side and a lower side of said plate at an inner circumferential portion thereof interposed between said upper and lower rubber ring portions.

3. A strut mount according to claim 2, wherein said lower radial-movement suppressing ring is embedded in said integral structure.

4. A strut mount according to claim 2 or 3, wherein each of said upper and lower radial-movement suppressing rings has a generally crank-like section.

5. A strut mount according to claim 2, wherein said lower radial-movement suppressing ring includes a falling portion which is not fixed to said plate, said falling portion being-exposed and not embedded in said integral structure comprising said lower rubber ring portion and coil spring receiving rubber ring portion.

6. A strut mount in a vehicular suspension system which receives a load from a shock absorber having a-piston rod, the strut mount comprising:

a washer fixable to a top end of the piston rod;

an upper sheet fixable to the piston rod at a predetermined distance from the washer;

an upper rubber ring portion and a lower rubber ring portion disposed between said washer and said upper sheet;

a plate disposed between said upper rubber ring portion and said lower rubber ring portion and extending outwardly in the radial direction; and a coil spring receiving rubber ring portion provided on a lower side of said plate for receiving a coil spring disposed about the shock absorber, at least said lower rubber ring portion and said coil spring receiving rubber ring portion being formed as an integral structure molded to said plate by vulcanization molding thereby defining a joining portion interconnecting said lower rubber ring portion and said coil spring receiving rubber,ring portion, said joining portion overlying at least an area portion of said lower side of said plate;

an upper radial-movement suppressing ring and a lower radial-movement suppressing ring fixed respectively to an upper side and said lower side of said plate at an inner circumferential portion thereof interposed between said upper and lower rubber ring portions;

said lower radial-movement suppressing ring including a falling portion which is not fixed to said plate, said falling portion being exposed and not embedded in said integral structure comprising said lower rubber ring portion and said coil spring receiving rubber ring portion; and said lower rubber ring and said coil spring receiving rubber ring portion each serving as impact absorbing bodies, said lower radial movement suppressing ring having, formed in the falling portion thereof, holes through which said lower rubber ring portion is integrally joined with said coil spring receiving rubber ring portion.

* * * * *